UNITED STATES PATENT OFFICE.

EDWARD P. SMITH, OF CHATTANOOGA, TENNESSEE, ASSIGNOR OF TWO-THIRDS TO MARK L. MORRISON AND GEORGE SCHINDLER, OF CHATTANOOGA, TENNESSEE.

COMPOSITION OF MATTER.

SPECIFICATION forming part of Letters Patent No. 726,776, dated April 28, 1903.

Application filed July 2, 1902. Serial No. 114,159. (No specimens.)

*To all whom it may concern:*

Be it known that I, EDWARD P. SMITH, a citizen of the United States, residing at Chattanooga, in the county of Hamilton and State of Tennessee, (whose post-office address is Chattanooga, Hamilton county, Tennessee,) have invented certain new and useful Improvements in a Composition of Matter, of which the following is a specification.

My invention relates to a new substance designed particularly as a substitute for cork and corkwood in all the uses to which the latter may be put. This substance is the equal in all respects of cork and corkwood; but it is superior in that it may be employed, owing to its cheapness, in many articles of manufacture wherein the cork itself would not serve or would be too expensive for commercial use.

The cheapness of this composition compared to cork and corkwood will produce the natural result of its competing in all lines in which cork enters as a factor. Bottle-stoppers, boots and shoes, &c., are merely instances of the wide and well-known uses of cork and corkwood, and consequently hint at the wide range of utility of this novel substitute for the same which I have invented.

The composition in general is a result of treating wood-pulp or other ligneous substances with certain elements. The success, however, of my composition is due to the proper mixing and manipulation of the particular elements constituting the same, which elements are wood-pulp, cornstalk-pith, gelatin, glycerin, and formaldehyde. The proportions, by volume, in which these elements are combined and from which are gained the most satisfactory results are as follows: three parts of wood-pulp, one part of cornstalk-pith, a solution of one part gelatin, one of glycerin, and four of water, and a solution of formaldehyde in water, one part to five.

The method of producing my composition from the above ingredients comprises the following steps: After thoroughly disintegrating the ligneous substances to be used and while the same are in a moist warm condition they are mixed with the solution of gelatin, glycerin, and water above described. At this stage the whole mass is thoroughly stirred, so as to obtain as perfectly commingled and homogeneous a mixture as possible. While the product of the last-named step is still warm, the superfluous or excess moisture is extracted in any well-known manner, and the substance is then, as the last step in this process, allowed to coagulate with the above-described solution of formaldehyde. The formaldehyde also renders the product insoluble to most liquids. It is in this last step that great care has to be exercised to secure the successful production of my composition; but upon the completion of this step the substance is subjected to pressure while congealing either by immediate molding into the form desired or may be pressed into mass to be afterward made up into a finished product composed of my novel substitute for cork and corkwood.

The foregoing is a description of my product and the method of producing the same; but I do not wish to be narrowly limited to the ingredients and proportions set forth, as slight changes may be introduced in both without materially affecting the nature of my substance.

What I do claim, and desire to secure by Letters Patent, is—

1. A composition of matter consisting of wood-pulp, cornstalk-pith, gelatin, glycerin, and formaldehyde, substantially as described.

2. A composition of matter consisting of ligneous substances gelatin, glycerin, and formaldehyde, substantially as set forth.

3. As a substitute for cork and corkwood, a composition of matter comprising the elements set forth in the proportions herein described, three parts of wood-pulp, one part of cornstalk-pith, a solution of one part gelatin, one of glycerin and four of water, and a solution of formaldehyde in water, one part to five, substantially as described.

In testimony whereof I affix my signature in presence of two witnesses.

EDWARD P. SMITH.

Witnesses:
M. H. DOUGHTY,
MILTON RUSSELL.